United States Patent

[11] 3,616,428

[72] Inventor David L. Bogue
Pompano Beach, Fla.
[21] Appl. No. 855,561
[22] Filed Sept. 5, 1969
[45] Patented Oct. 26, 1971
[73] Assignee KMS Industries, Inc.
Ann Arbor, Mich.

[54] POWER SPINDLE FOR ELECTROCHEMICAL GRINDING
6 Claims, 3 Drawing Figs.

[52] U.S. Cl..................................................... 204/212,
204/224, 204/297
[51] Int. Cl..................................................... C23b 5/70,
B23p 1/10
[50] Field of Search........................................... 204/212,
224, 297 R

[56] References Cited
UNITED STATES PATENTS
3,461,059 8/1969 Krueger...................... 204/297 R

*Primary Examiner*—John H. Mack
*Assistant Examiner*—D. R. Valentine
*Attorney*—Barnes, Kisselle, Raisch & Choate ABSTRACT: A power spindle for electrochemical grinding machine utilizing a grinding wheel, there being an electrical connection to the moving wheel accomplished through a body of mercury. An annular recess formed in a drive housing on the rotating spindle confines the body of mercury and an annular plate, insulated from the spindle and forming a drive motor, is mounted in a manner to be supported by the motor and fastened to project into the annular recess to create an electrical connection between a secondary housing surrounding the motor and the drive housing which rotates with the spindle.

PATENTED OCT 26 1971 3,616,428

INVENTOR
DAVID L. BOGUE
BY
Barnes, Kisselle, Raisch & Choate
ATTORNEYS

POWER SPINDLE FOR ELECTROCHEMICAL GRINDING

This invention relates to a power spindle assembly for electrochemical grinding and more particularly to a means for transmitting electrical power from a stationary connection to a rotating grinding wheel. It is an object of the present invention to provide a relatively simple and efficient moving connection for the transmission of electrical power in a manner to avoid arching and losses and destructive corrosion.

It is a further object to provide a moving connection which is accomplished through a body of mercury, so confined that there is a protective seal to isolate electrolyte liquid from the interior portions of the relatively moving parts.

Other objects and features of the invention relating to details of construction and operation will be apparent in the following description and claims in which the principles of the invention are set forth together with the manner of use in connection with a preferred embodiment of the invention.

Figure 1:
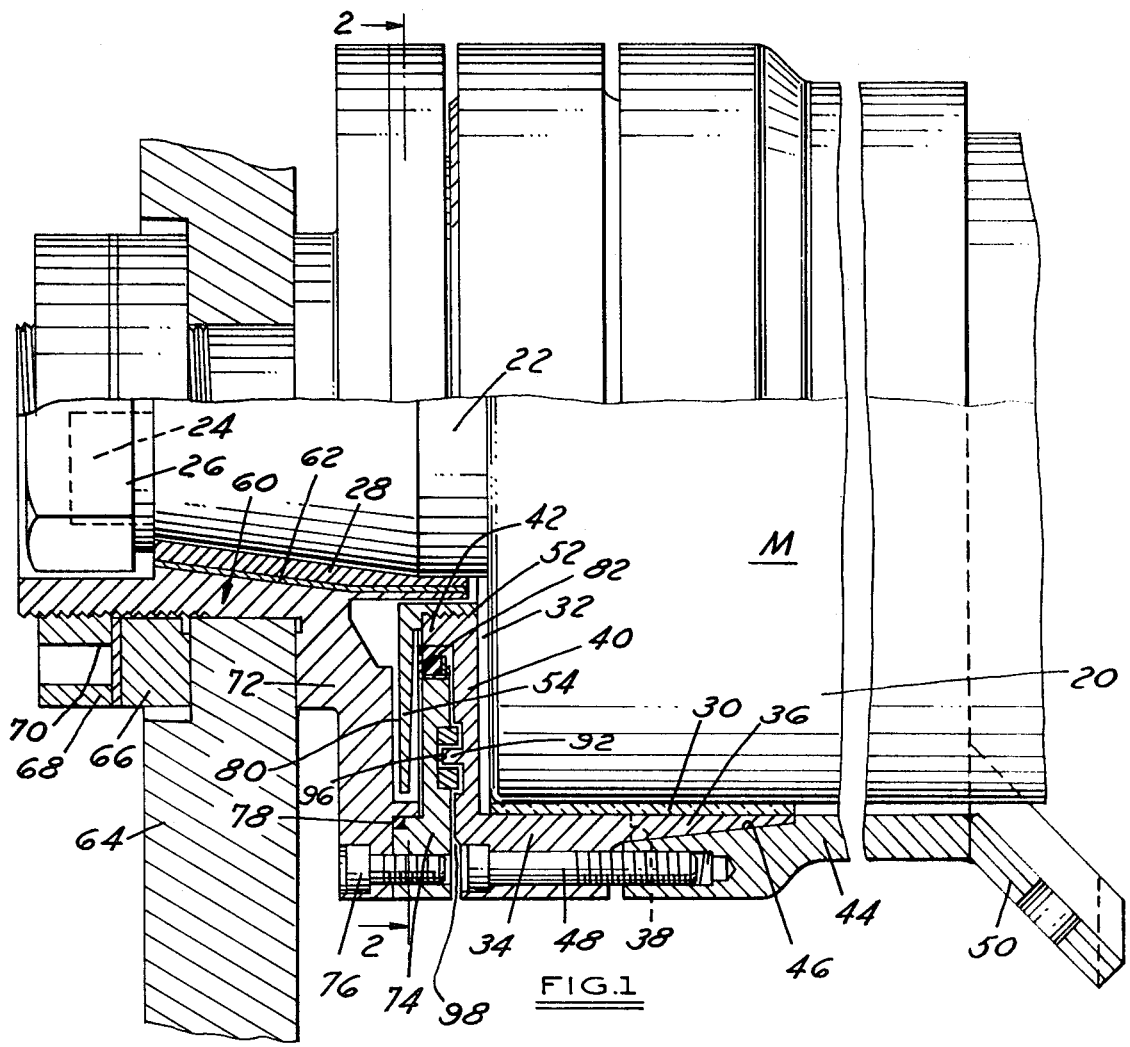

Drawings accompany the disclosure and the various views thereof may be briefly described as:

FIG. 1, a sectional view of the power spindle assembly illustrating the relative position of the part.

Figure 2:
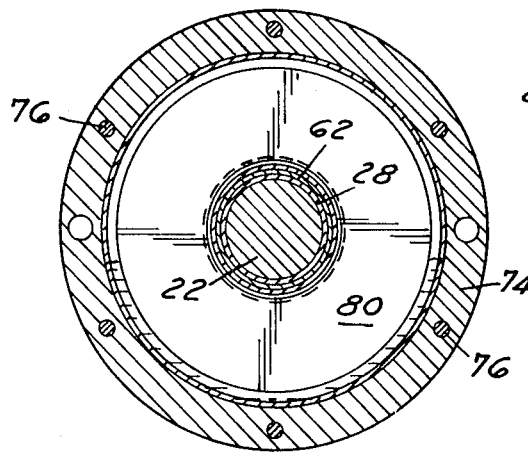

FIG. 2, a sectional view on line 2—2 of FIG. 1.

Figure 3:
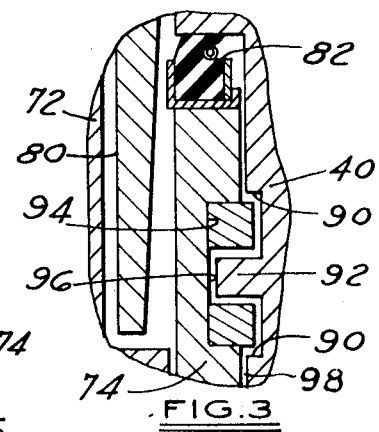

FIG. 3, an enlarged view of a pressure seal provided between relatively moving parts.

REFERRING TO THE DRAWINGS

An electric motor M has a housing shell 20 and a driving spindle 22 projecting from the housing. The spindle 22 has a tapered end portion with a threaded projection 24 for receiving a holding nut 26. Surrounding the the spindle 22 is a sleeve 28 having a tapered inner recess which complements the outer surface of spindle 22 and which is intended to be clamped on the spindle for a driving connection.

A secondary motor housing is supported by the housing 20 but insulated from it by a cylindrical section 30 of green glass and an open centered disc 32 of green glass. This glass insulates a cylindrical secondary motor housing 34 from the metallic motor housing, the segment 34 consisting of a cylindrical wall portion which tapers into a reducing section 36 which is provided with spaced slots 38 around its periphery. About eight slots are equally spaced around the housing 34 at the tapered section. The housing 34 has an inwardly extending flange 40 which terminates in a threaded opening centrally of the flange with a short axial hub extension 42.

A second portion of the secondary motor housing comprises a cylindrical sleeve 44 having a tapered recess 46 intended to telescope over the tapered section 36. Bolts 48 circumferentially spaced around the unit will draw the two housing portions 34 and 44 together permitting a certain pressure to develop on the telescoping portions to lock the housing on the motor with the glass sleeve 30 interposed as an insulator. At the open end of the secondary housing is an electrical connecting flange 50 which is used for the connection of electrical power to be transmitted to the spindle.

Threaded into the opening in flange 40 is a hub 52 which extends axially outward beyond the extension 42 where it joins an integrally formed thin flange 54 which has walls tapering slightly toward the outer periphery. All of the stationary parts 34, 44 and 52, 54 are formed of conductive material.

Reverting now to the sleeve 28 on spindle 22, it will be seen that this carries a driving spindle housing 60 having also a tapered central recess which is bonded by an insulating material 62 to the sleeve 28. The outer end of the spindle drive housing 60 is substantially cylindrical in form and carries an electrochemical grinding wheel 64 held in place by a spacer 66 and a nut 68 threaded on to the end of the housing 60. The nut has openings 70 to accommodate a spanner-type wrench.

The housing 60 also has a radially extending flange portion 72 which extends radially outwardly and which carries a return flange 74 extending radially inward. The two flanges are connected by circumferentially spaced bolts 76 and an O-ring seal 78 seals the joint between these parts. The two flanges 72 and 74 are so shaped as to form an annular recess 80 into which the thin flange 54 projects, the parts being spaced so that there is no direct contact. At the inner periphery of the return flange 74 is a notched compressible seal ring 82 preferably formed of neoprene confined in a grooved ring which provides a running seal between the stationary flange hub 42 and the rotating return flange 74. A round spring is seated in the notch of the ring seal.

Between the outer wall of return flange 74 and the outer wall of the flange 40, as shown in FIG. 3, is a pumping-type seal. This is created by two relatively shallow radially spaced annular grooves 90 in part 40 between which is an annular projection 92. Mounted in circumferentially spaced slots 94 in part 74 are some short fins on either side of a groove 96, these fins projecting into the grooves 90. Thus, relative rotation between the parts creates a pumping action which exerts pressure outwardly in the recess 98 between the flanges. This tends to prevent the entry of any foreign matter such as liquid electrolyte which is in the vicinity of this opening.

Within the recess 80 is a quantity of liquid mercury which rotates with the drive housing 60 and creates an electrical contact between the flange 54 and the drive housing, this being carried to the electrochemical grinding wheel 64 which can accomplish its function in its rotating operation. The seals are designed for long life, especially when the parts are manufactured to minimize runout between the stationary and the rotating elements. It has also been found that if the housing 72–74 and the flange 54 are manufactured from a mercury wettable material such as copper, the life is better.

What is claimed as new is as follows:

1. A power spindle assembly for electrochemical grinding which comprises:
   a. a motor having a housing and a driving spindle projecting therefrom and a secondary motor housing insulated from said motor housing and said spindle,
   b. a metal sleeve fitted to said spindle,
   c. a sleeve formed of insulating material surrounding and bonded to said metal sleeve,
   d. a drive housing to rotate with said driving spindle to carry an electrochemical grinding tool, said drive housing surrounding said sleeves having a recess with inner surfaces bonded to said insulating material and a radially extending flange portion on said drive housing having a relatively thin, radially extending, annular recess closed at its outer periphery and open centrally adjacent said sleeves,
   e. an annular stationary blade supported on but insulated from said motor housing and mounted conductively on said secondary motor housing and projecting radially into but out of contact with said annular recess,
   f. means including said secondary motor housing for connecting said annular blade to a source of electromotive power, and
   g. a quantity of liquid mercury in said annular recess to transmit electromotive power from said blade to said drive housing.

2. A power spindle assembly as defined in claim 1 in which the drive housing has a thin axially extending flange, and said annular blade has a hub overlying but spaced from said thin flange, and a return portion of said radially extending flange underlies said hub, and a running seal positioned between said return portion and said motor housing.

3. A power spindle assembly as defined in claim 1 in which one portion of said drive housing comprises a radially inwardly extending return flange forming a wall of said annular recess, said return flange having a central opening, an axially extending portion on said secondary motor housing lying within said central opening, and a running compressible seal between said axially extending portion and the periphery of said central opening to create a seal.

4. A power spindle assembly as defined in claim 3 in which said return flange wall lies closely adjacent but spaced from a radial wall of said secondary motor housing, and means on said flange wall and means on said radial wall to cooperate to create a radially outward pressure upon mutual rotation of said flange and wall to serve to exclude electrolyte in an electrochemical grinding operation.

5. A power spindle assembly as defined in claim 4 in which said means comprises a groove in one of said walls and circumferentially spaced fins on the other of said walls positioned to move in said groove to create a pumping action effecting radially outward pressure in the space between said walls to exclude electrolyte.

6. A power spindle assembly as defined in claim 1 in which the secondary motor housing comprises a conductive shell having a cylindrical portion overlying but spaced from said motor housing, said cylindrical portion terminating at an open end in a tapered portion thinning toward the open end and provided with axial slots, and terminating at the other end in an inwardly extending radial wall positioned to lie adjacent said flange of said drive housing, and a second conductive cylindrical housing having an open end formed with a tapered recess to interfit with said tapered portion of said conductive shell in a telescoping relationship, and means on said second cylindrical housing for connection of electromotive power.

* * * * *